July 21, 1942.  A. W. NORMAN  2,290,812
STRING BEAN SLICER
Filed Dec. 19, 1940  4 Sheets-Sheet 1
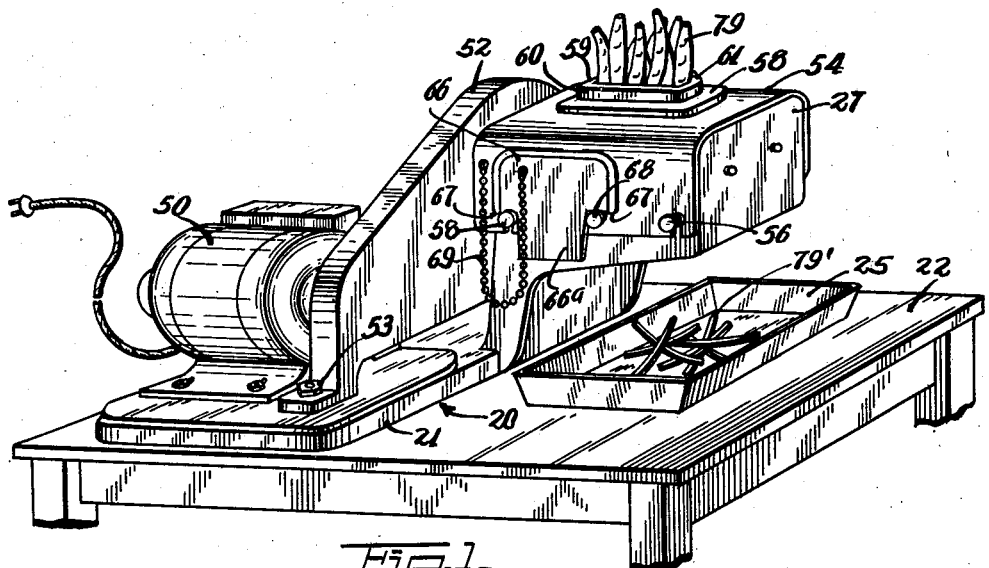
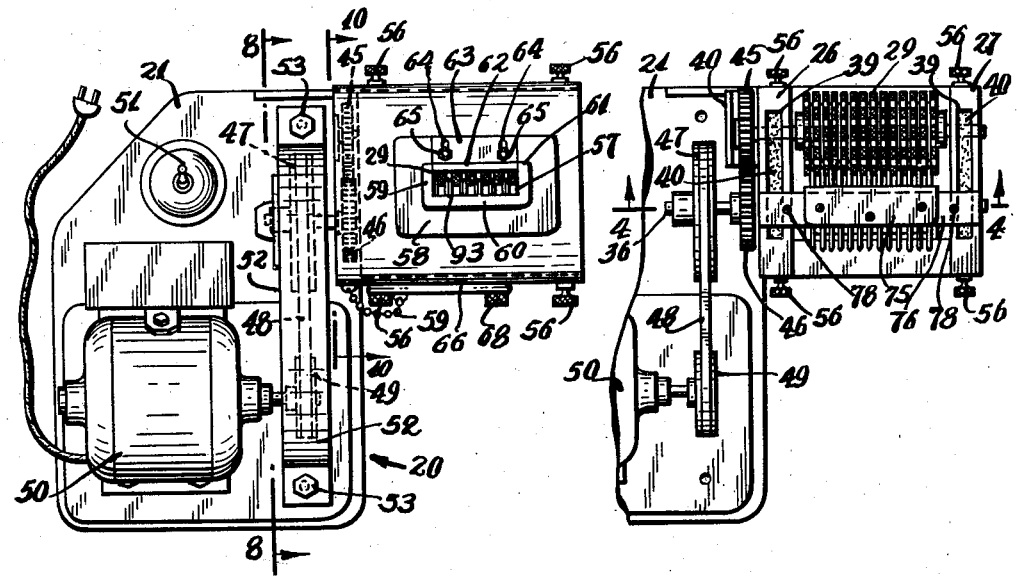
INVENTOR
*Arthur Wm Norman*
BY
ATTORNEY

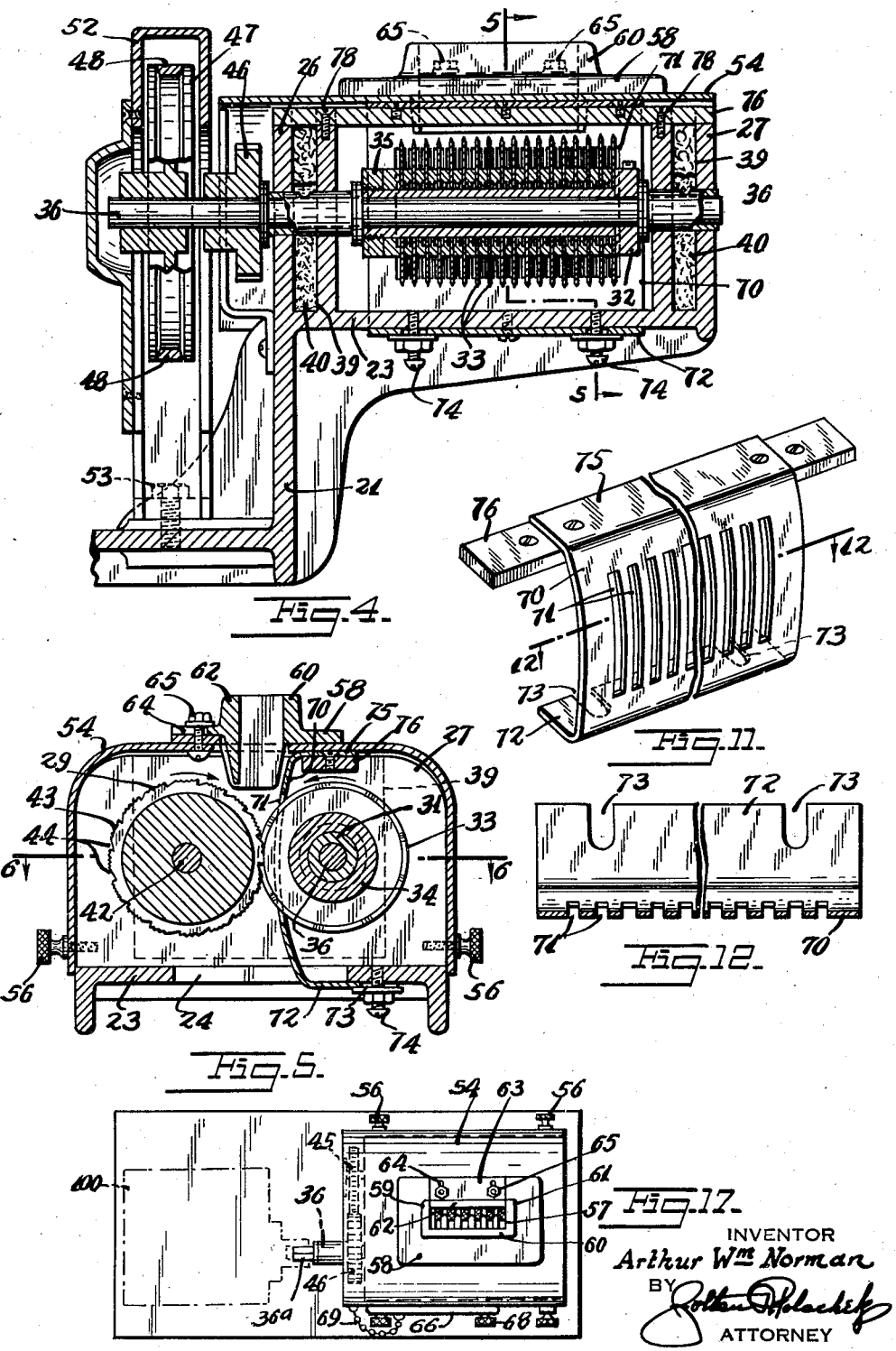

July 21, 1942.  A. W. NORMAN  2,290,812
STRING BEAN SLICER
Filed Dec. 19, 1940  4 Sheets-Sheet 3

INVENTOR
Arthur Wm Norman
BY
ATTORNEY

July 21, 1942.    A. W. NORMAN    2,290,812

STRING BEAN SLICER

Filed Dec. 19, 1940    4 Sheets-Sheet 4

INVENTOR
Arthur W<sup>m</sup> Norman
BY
ATTORNEY

Patented July 21, 1942

2,290,812

UNITED STATES PATENT OFFICE 2,290,812

STRING BEAN SLICER

Arthur William Norman, New York, N. Y.

Application December 19, 1940, Serial No. 370,760

3 Claims. (Cl. 146—122)

This invention relates to new and useful improvements in a string bean slicer.

This application is for improvements to United States patent to Norman No. 2,068,464, issued January 19, 1937.

There is an increasing tendency in hotels and cafeterias, to slice string beans directly into the pot in which they are to be cooked. As cooked Julienne string beans will not keep their freshness and color, in a steam table, the string beans are sliced and cooked about every hour, as needed. Beans so prepared have a color and garden fresh flavor far superior to canned beans.

There is a demand for a portable, self contained slicing machine, that will rapidly slice Julienne string beans, directly into the pot in which they are to be cooked. The machine must be fast, so that it can be used in the rush hours, and properly guarded, so that it can be used by inexperienced employees. This invention is designed to fill this demand.

This invention is an electrically operated portable machine, that can be placed on a kitchen table. It will slice Julienne string beans straight and evenly, and across their flat sides, in such a manner that the seeds do not fall out in cooking. Beans can be cut diagonally, by inserting them at an angle, and curved C shaped beans can be cut straight, if inserted in the mouthpiece with the open side of the C facing down.

The invention proposes to characterize the Norman string bean slicer by the fact that it includes a frame having a base portion for resting on a table, and an elevated overhanging top portion formed with a discharge opening beneath which a pan may be placed to catch the sliced string beans. It is contemplated providing the top portion with a pair of vertical walls on opposite sides of the discharge opening, and mounting the disc cutters and feeding drum between these vertical wall portions.

Furthermore, the invention contemplates the provision of drive means for the cutters and drum, characterized by a motor mounted on the base portion and a transmission system from the motor to the cutters and drum.

Still further the invention contemplates a novel arrangement of a guard casing mounted across the vertical walls for enclosing the cutters and drum, and provided with an inlet opening and an adjustable control for the inlet opening, for regulating its width.

Still further the invention proposes a novel way of mounting a deflecting slotted plate for the disc cutters. It is proposed to support the top of the plate upon a bar placed across said vertical walls, to have the plate extend downwards, with the cutters extending through slots in the plate, and to extend the plate through the discharge opening of the frame, and to adjustably hold the bottom end thereof to control the position of the slotted or guard plate.

Still further the invention proposes a novel arrangement of a pusher member, mounted in a certain way on the side of the slicer. If excessive amounts of beans are inserted into the slicer mouthpiece, a jam will be caused. The natural tendency of the operator is to push a knife or fork into the slicer mouthpiece, to clear this jam. To prevent this, the pusher member is provided. This can be inserted even when the machine is in operation, and will effectively clear all jams, without damage to the slicer blades.

Still further the invention proposes a novel bearing arrangement for the disc cutters and feeding drum.

The invention also contemplates a certain construction of the feeding drum.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure—

Fig. 1 is a perspective view of a string bean slicer constructed in accordance with this invention.

Fig. 2 is a plan view of the slicer shown in Fig. 1 drawn on a reduced scale.

Fig. 3 is a fragmentary plan view of Fig. 2 with certain parts removed to disclose other parts.

Fig. 4 is a fragmentary enlarged vertical sectional view taken on the line 4—4 of Fig. 3.

Fig. 5 is a transverse vertical sectional view taken on the line 5—5 of Fig. 4.

Fig. 11 is a perspective view of the deflecting guard plate and support bar, per se.

Fig. 12 is a horizontal sectional view taken on the line 12—12 of Fig. 11.

Fig. 17 is a plan view of a string bean slicer constructed in accordance with another form of this invention.

Figure 6:
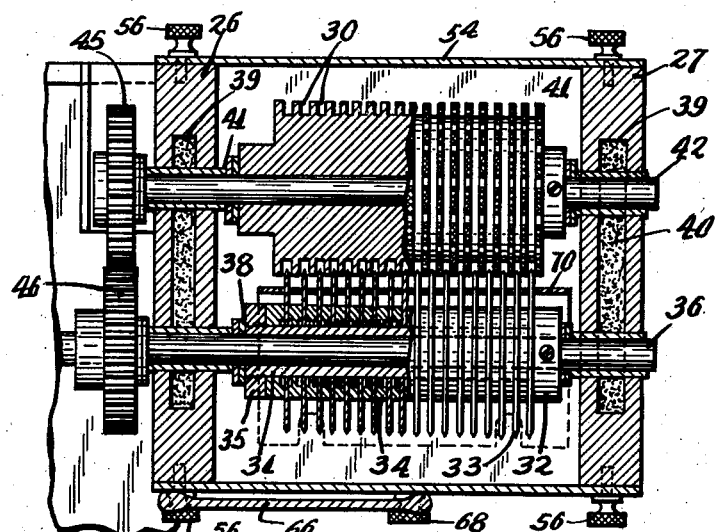
Fig. 6 is a fragmentary horizontal sectional view taken on the line 6—6 of Fig. 5.

The string bean slicer, in accordance with this invention, includes a frame 20 having a base portion 21 for resting on a table 22 and an elevated overhanging top portion 23 formed with a discharge opening 24 beneath which a pan 25 may be placed and rested on the table 22. The top portion 23 is provided with a pair of vertical walls 26 and 27 on opposite sides of the discharge opening 24. A disc cutter assembly 28 is journaled between the walls 26 and 27. A knurled surface feed drum 29 is journaled between the vertical walls 26 and 27, and is provided with a plurality of grooves 30 receiving the cutters of the disc cutter assembly 28. In addition to being knurled, cross cuts are made across the face of the drum, and the circumferential edges of the knives extend below the bottom of these cross cuts.

The disc cutter assembly 28 comprises a tubular member 31 having a head 32 at one end and a plurality of disc cutters 33 separated by washers or spacers 34 extended along its length, between the head 32 to the other end. At the latter end, a nut 35 threadedly engages on the tubular member 31 to hold the disc cutter assembly as a unit. The arrangement is such that the nut 35 may be removed, when desired, and the various cutters 33 and spacers 34 may be removed and replaced. The disc cutter assembly 28 is supported by a shaft 36 which is journaled in the walls 26 and 27, and which passes through the tubular member 31. A washer 38 is mounted on the shaft 36 immediately adjacent the nut 35.

The walls 26 and 27 are formed with openings 39 extended inwards from the top edges thereof. These openings are filled with lubricant material 40, such as wool yarn saturated with vaseline, and adapted to lubricate the shaft 36. The drum 29 is provided with tubular bearings 41 secured to its ends. A shaft 42 passes through the bearings 41 and through the walls 26 and 27. The lubricating material 40 is also adapted to lubricate the bearings 41.

The feeder drum 29 is of cylindrical shape and has a knurled surface 43 at areas between the grooves 30. These knurled surfaces 43 are interrupted with a plurality of spaced notches 44 adapted to assist in feeding the string beans to the cutters 33. Means is provided for driving the cutter assembly 28 and the knurled surface drum 29. This means includes a gear 45 mounted on the shaft 42 and meshing with a gear 46 mounted on the shaft 36. The shaft 36 is also provided with a pulley 47 which is engaged by a belt 48 extending over a pulley 49 of an electric motor 50 which is mounted on the base 21. An electric switch 51 for controlling the motor 50 is also mounted on the base 21 to one side of the motor. A guard casing 52 engages over the pulleys 47 and 49 and the belt 48, and is removably mounted on the base portion 21 with fastening elements 53.

Figures 13, 15:
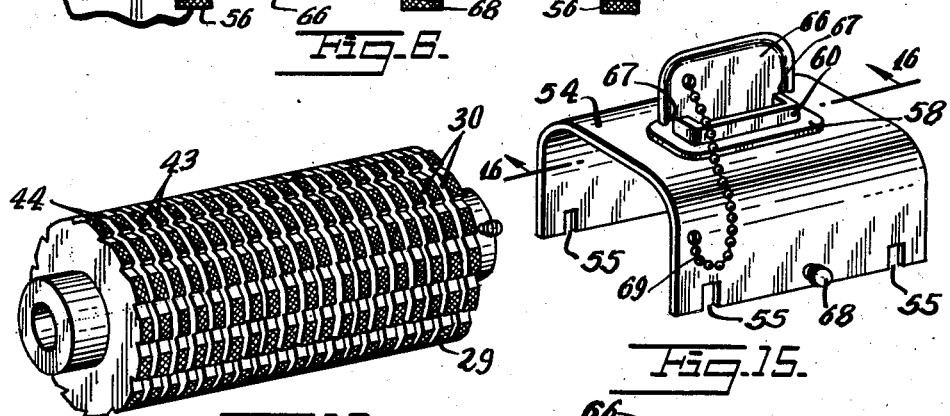
Fig. 13 is a perspective view of the feeding drum.
Fig. 15 is a perspective view of the sheet casing per se.

A sheet casing 54 is mounted across the vertical walls 26 and 27 encasing the disc cutter assembly 28 and feeding drum 29. This casing 54 is of inverted U-shape as illustrated in Fig. 15. It is provided with several notches 55 at the bottom edges of its sides which engage clamp screws 56 mounted on the overhanging top portion 23. The arrangement is such that the screws 56 may be loosened when it is desired to remove the casing 54, or they may be tightened to fixedly hold the casing in position.

The casing 54 is provided with an inlet opening 57 on its top portion. This inlet opening 57 is associated with means for shutting off a portion thereof to control its size. This means includes a plate 58 mounted on the casing 54 and having an opening surrounded at three sides by the flanges 59, 60 and 61. Another flange 62 extends across the fourth side. This flange 62 comprises one arm of an angle member having an arm 63 adjustably mounted on the plate 58. The arm 63 is provided with slots 64 through which clamp bolts 65 pass. The bolts 65 may be loosened and the flange 62 may be shifted to change the size of the inlet opening 57. The bolts 65 may then be screwed back into position to hold the flange 62 in its new position.

Figures 14, 16:
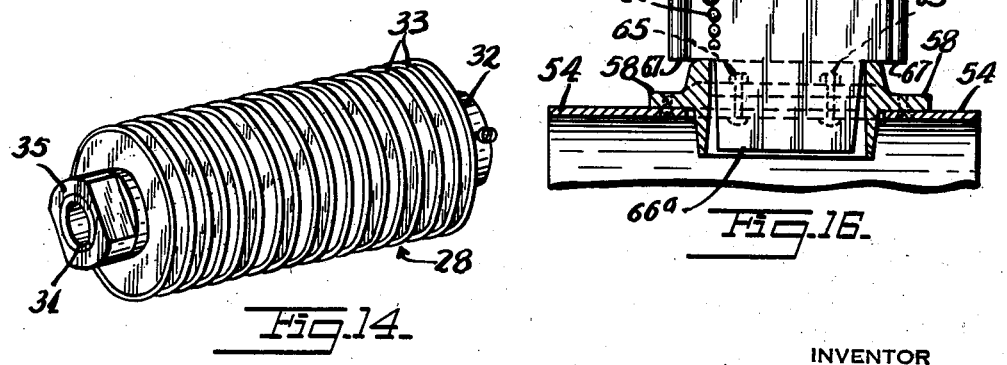
Fig. 14 is a perspective view of the disc cutter assembly.
Fig. 16 is a fragmentary sectional view taken on the line 16—16 of Fig. 15.
Figure 7:
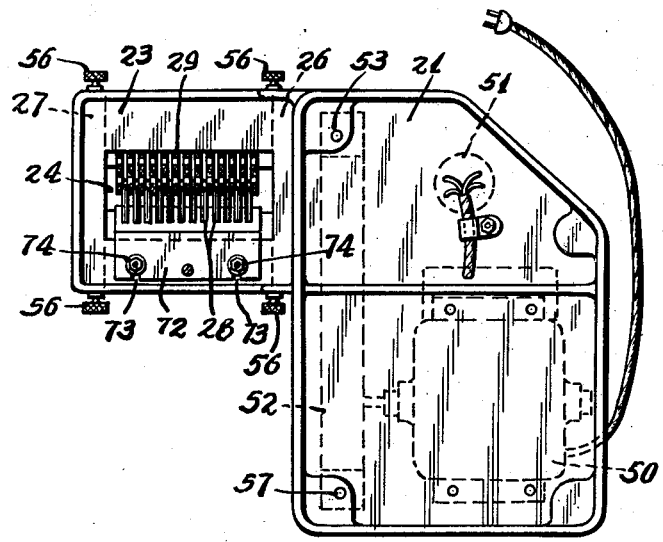
Fig. 7 is a bottom view of Fig. 2.
Figure 9:
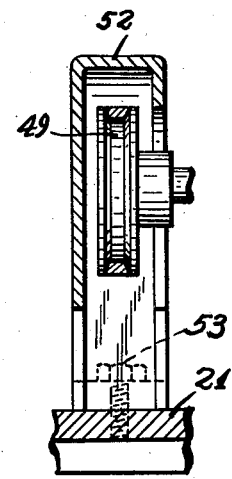
Fig. 9 is a fragmentary vertical sectional view taken on the line 9—9 of Fig. 8.
Figure 8:
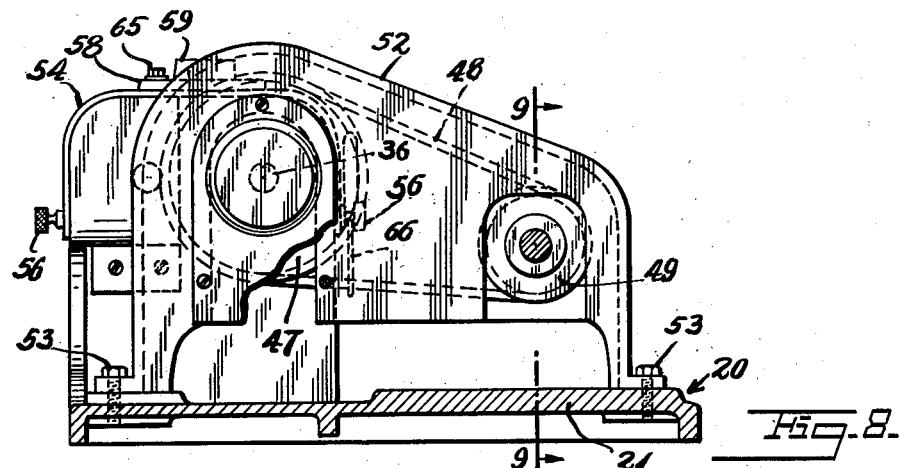
Fig. 8 is a fragmentary enlarged vertical sectional view taken on the line 8—8 of Fig. 2.
Figure 10:
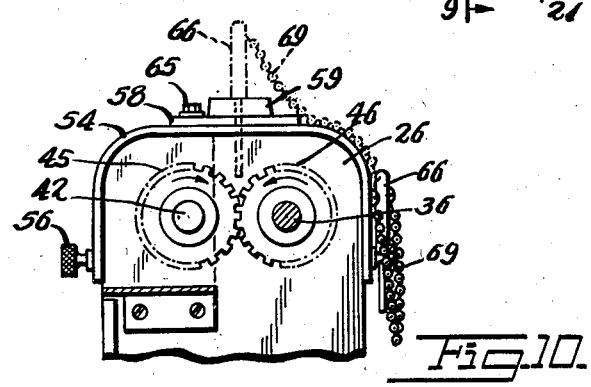
Fig. 10 is a fragmentary enlarged vertical sectional view taken on the line 10—10 of Fig. 2.

A pusher member 66 is provided for clearing jams in the opening 57. This pusher member is normally rested in an inoperative position on the side of the casing 54, as illustrated in Figs. 1 and 2. The pusher 66 comprises a plate having a reduced bottom end portion 66ª to form the shoulders 67. When not in use, the pusher member is supported by these shoulders 67 resting on one of the screws 56 and an auxiliary screw 68 mounted on the casing 54. A chain 69 has one end attached to the casing 54 and the other end to the pusher member 66 to prevent the pusher member from being lost. When desired the pusher member 66 may be gripped at the top, and removed from its inoperative position, and engaged in the opening 57 as illustrated in Figs. 15 and 16 to clear jams in mouthpiece, without damage to slicer blades or drum.

A deflecting guard plate 70 is supported across the vertical walls 26 and 27 and extends downwards, and is provided with a plurality of slots 71 through which the cutters 33 pass. This guard plate 70 extends through the discharge opening 24 and is adjustably held at its bottom end. More specifically, the bottom end of the guard plate 70 terminates in a flange 72 provided with two slots 73. This flange 72 extends beneath the edge portion of the opening 24 (see Fig. 5). Two fastening screws 74 are mounted on the bottom of the overhanging top portion 23 and engage the slots 73 for fixedly holding the guard plate 70 in adjusted positions. The top portion of the guard plate 70 is provided with a flange 75 which is attached to a bar 76. This bar 76 extends across the vertical walls 26 and 27. Several fastening elements 78 pass through the bar 76 and into the material of the walls 26 and 27 (see Fig. 4) for fixedly holding the bar 76 and thus the guard plate 70 in position.

The operation of the device is as follows:

A batch of string beans 79 may be placed into the inlet opening 57 and placed or dropped down against the deflecting guard plate 70 and in between the cutters 33 and the knurled surface feeding drum 29. The string beans will be sliced "Julienne" style, in long thin strips, as indicated in the drawing by reference numeral 79', and discharged into the pan 25.

The pusher member 66 is used to facilitate the passage of the string beans through the slicing machine in case of a jam. The flange 62 may be adjusted to control the size of the opening 57 to act as a guard for the fingers, and also to force the operator to insert beans flat, and in the amounts desired. The deflecting guard plate 70 may be shifted forwards or rearwards so as to expose or cover the operative edge portions of the disc cutters 33 to adapt the machine for string beans of different sizes. Thus if thick string beans are used it is desirable that the deflecting guard 70 be shifted rearwardly slightly, and if thinner string beans are used the guard plate 70 must be adjusted correspondingly.

If desired the disc cutters and the knurled surface drum may be driven by other means than said electric motor, as for example, it may be driven by other machines in the establishment.

It is to be understood that by means of this device, string beans of various sizes may be neatly sliced by the layman, since the knurled feeder drum 29 will grip varied sizes of string beans and feed them through the slicer. The design of the mouthpiece forces operators to insert beans flat. If careless operators will not insert beans flat, the mouthpiece can be adjusted so that the operator is forced to insert beans flat, as they cannot be inserted otherwise.

In the modified form of the invention illustrated in Fig. 17 a string bean slicer has been disclosed which distinguishes from the prior form in the means for driving the device. In accordance with this form of the invention the shaft 36 is provided with a coupler portion 36ª adapted to be coupled with any other machine, or prime mover present in an establishment, and generally indicated in Fig. 17 by the dot and dash lines 100. With this arrangement the need of a separate electric motor has been eliminated. In other respects this form of the invention is similar to the previous forms and like parts are identified by like reference numerals.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In a string bean slicer, a frame having a base portion for resting on a table and an elevated overhanging top portion formed with a discharge opening beneath which a pan may be placed, said top portion having a pair of vertical walls on opposite sides of said discharge opening, disc cutters journaled on said walls, a knurled and toothed surface drum rotatively mounted between said vertical walls and having grooves receiving said cutters, means for driving said drum and cutters, a sheet casing mounted across said vertical walls and having an inlet opening, means for shutting off a portion of said inlet opening, and a deflecting guard plate supported across said vertical walls and extending downwards and having slots through which said cutters pass and extending through said discharge opening and being adjustably held at its bottom end, said sheet casing being of inverted U-shaped and having notches in its bottom edge, clamp screws mounted upon said overhanging top portion and engaging said notches for releasably holding the sheet casing in position, and a pusher member for clearing the string beans from said inlet opening and having side shoulders for limiting insertion of the pusher into said inlet opening.

2. In a string bean slicer, a frame having a base portion for resting on a table and an elevated overhanging top portion formed with a discharge opening beneath which a pan may be placed, said top portion having a pair of vertical walls on opposite sides of said discharge opening, disc cutters journaled on said walls, a knurled and toothed surface drum rotatively mounted between said vertical walls and having grooves receiving said cutters, means for driving said drum and cutters, a sheet casing mounted across said vertical walls and having an inlet opening, means for shutting off a portion of said inlet opening, and a deflecting guard plate supported across said vertical walls and extending downwards and having slots through which said cutters pass and extending through said discharge opening and being adjustably held at its bottom end, said sheet casing being of inverted U-shape and having notches in its bottom edge, clamp screws mounted upon said overhanging top portion and engaging said notches for releasably holding the sheet casing in position, and a pusher member for clearing the string beans from said inlet opening and having said shoulders for limiting insertion of the pusher into said inlet opening, and a length of chain having one end securely attached to said pusher and its other end attached to said casing preventing said pusher from being misplaced.

3. In a string been slicer, a frame having a base portion for resting on a table and an elevated overhanging top portion formed with a discharge opening beneath which a pan may be placed, said top portion having a pair of vertical walls on opposite sides of said discharge opening, disc cutters journaled on said walls, a knurled and toothed surface drum rotatively mounted between said vertical walls and having grooves receiving said cutters, means for driving said drum and cutters, a sheet casing mounted across said vertical walls and having an inlet opening, means for shutting off a portion of said inlet opening, and a deflecting guard plate supported across said vertical walls and extending downwards and having slots through which said cutters pass and extending through said discharge opening and being adjustably held at its bottom end, said sheet casing being of inverted U-shape and having notches in its bottom edge, clamp screws mounted upon said overhanging top portion and engaging said notches for releasably holding the sheet casing in position, and a pusher member for clearing the string beans from said inlet opening and having side shoulder for limiting insertion of the pusher into said inlet opening, and means for supporting said pusher in an inoperative position upon the side of said casing.

ARTHUR WM. NORMAN.